United States Patent [19]

Chapman

[11] Patent Number: 5,399,226
[45] Date of Patent: Mar. 21, 1995

[54] METHOD AND APPARATUS FOR ATTACHING CLEATS

[75] Inventor: Donald K. Chapman, Eugene, Oreg.

[73] Assignee: Flexible Steel Lacing Company, Downers Grove, Ill.

[21] Appl. No.: 202,704

[22] Filed: Feb. 16, 1994

Related U.S. Application Data

[63] Continuation of Ser. No. 580,933, Sep. 11, 1990, abandoned.

[51] Int. Cl.⁶ .............................................. B29D 30/8
[52] U.S. Cl. ................................ 156/408; 156/411; 156/421.6; 156/583.4; 156/583.5; 198/611
[58] Field of Search ............... 156/497, 297, 358, 408, 156/409, 421.6, 439, 442.4, 507, 543, 580, 582, 583.1, 583.4, 583.5; 198/611

[56] References Cited

U.S. PATENT DOCUMENTS

| | | |
|---|---|---|
| 3,607,570 | 9/1971 | Hildebrandt ........................ 156/497 |
| 3,962,016 | 6/1976 | Alfter et al. ........................ 156/497 |
| 3,986,918 | 10/1976 | Berner ................................ 156/497 |
| 3,989,577 | 11/1976 | Watson .............................. 156/497 |
| 4,229,155 | 10/1980 | Gallatly et al. ..................... 156/497 |
| 4,373,412 | 2/1983 | Gerber et al. ......................... 83/24 |
| 4,440,588 | 4/1984 | Stevenson et al. ................. 156/497 |
| 4,447,288 | 5/1984 | Seaman .............................. 156/497 |
| 4,964,937 | 10/1990 | Seki .................................... 156/497 |
| 4,976,811 | 12/1990 | Siebert ................................ 156/497 |

Primary Examiner—Patricia J. Ryan
Assistant Examiner—Merrick Dixon
Attorney, Agent, or Firm—Fitch, Even, Tabin & Flannery

[57] ABSTRACT

An apparatus for attaching cleats to belts in which belts and cleats are heated to a fusing temperature with a wheel subsequently rolled over the cleats. The apparatus provides means for adjusting the orientation of the wheel to allow attachment of cleats either longitudinally or transversely, as well as the ability to accommodate straight or angled cleats.

15 Claims, 7 Drawing Sheets

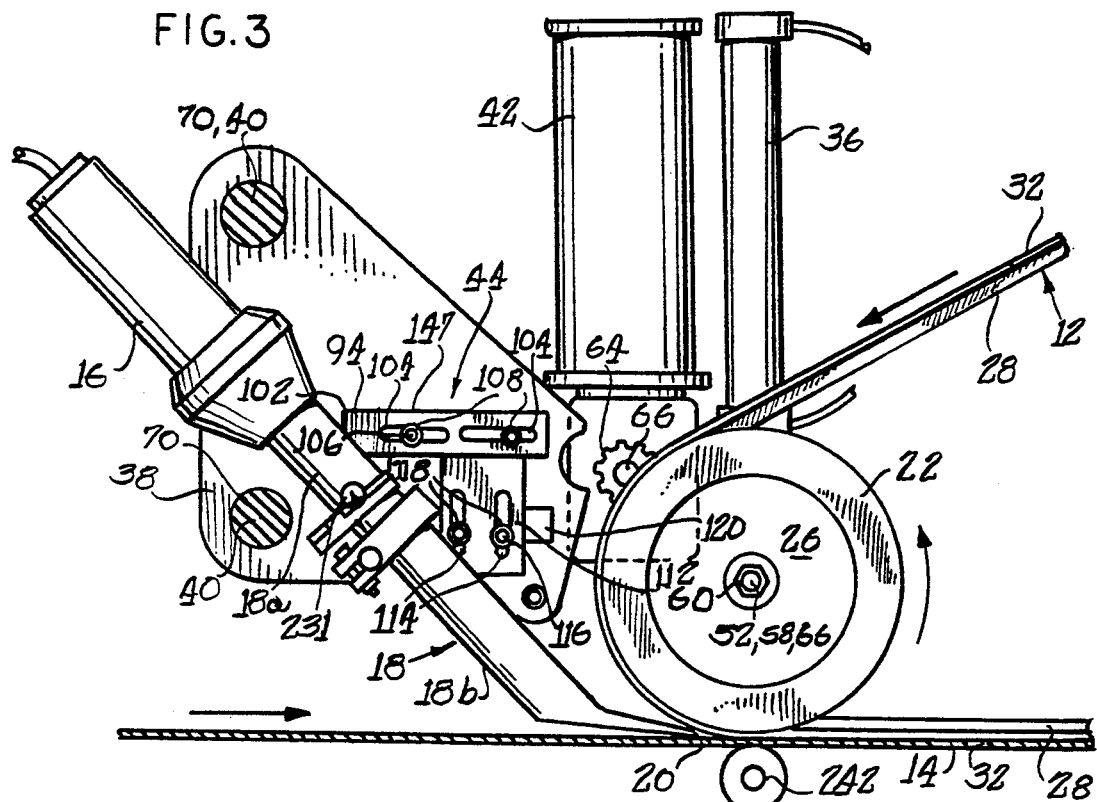
FIG. 3
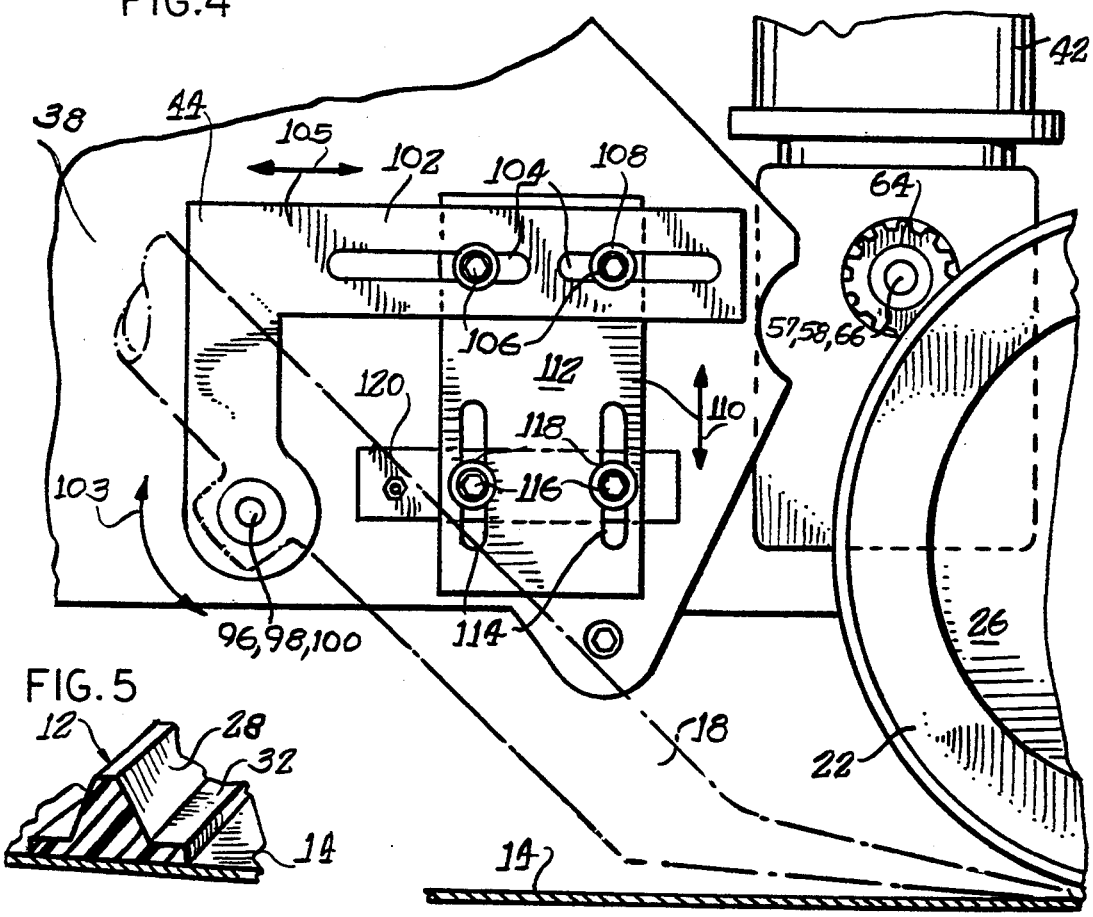
FIG. 4
FIG. 5

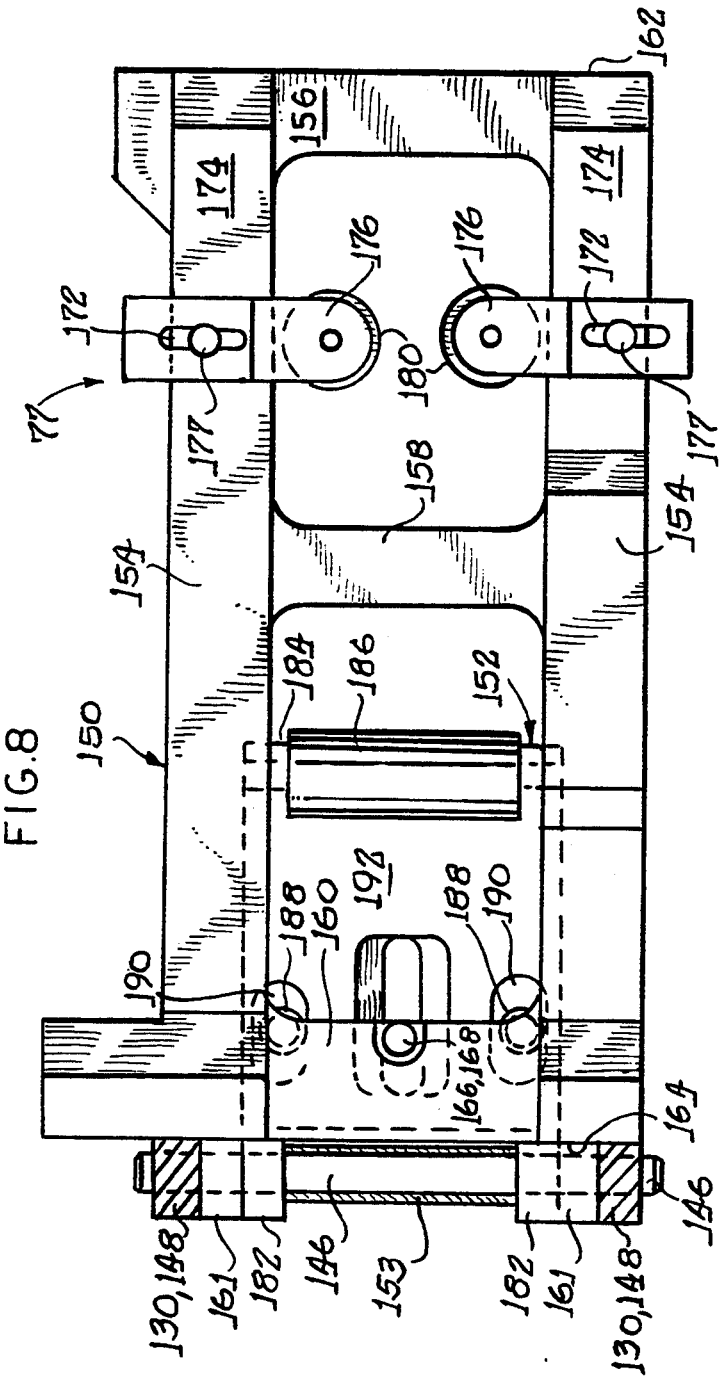
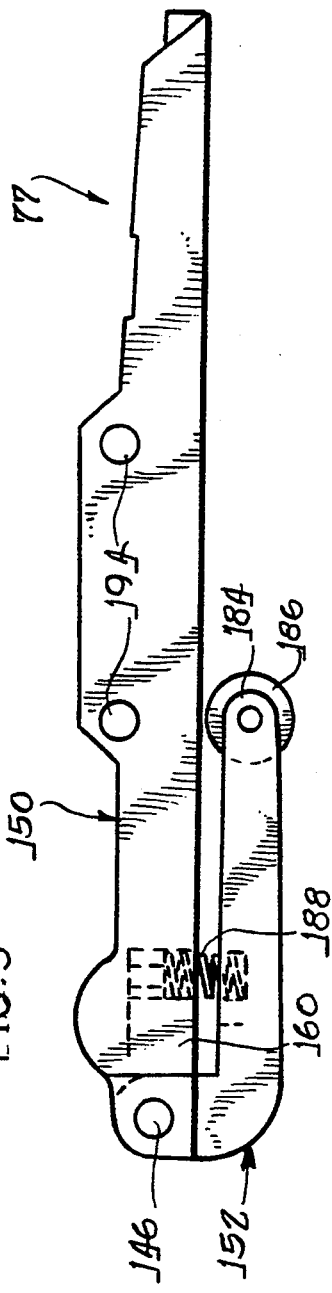
FIG. 8
FIG. 9

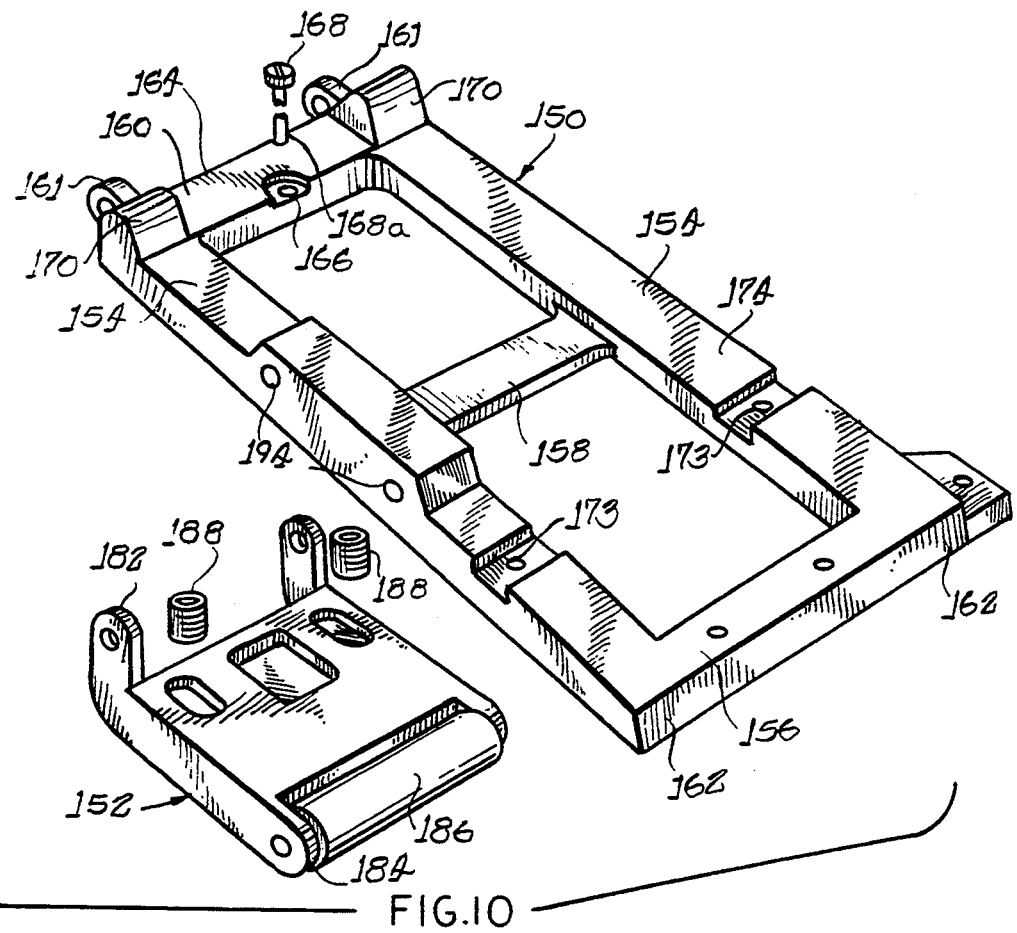
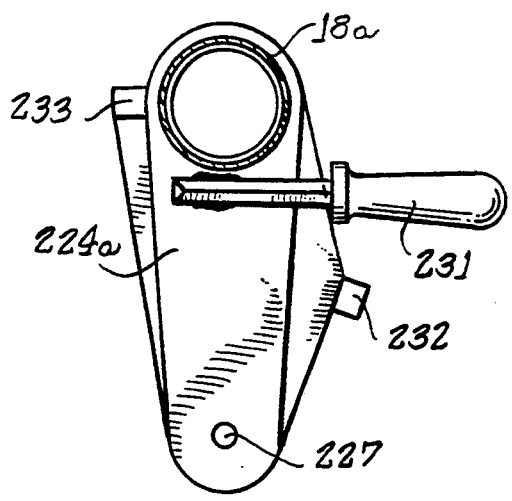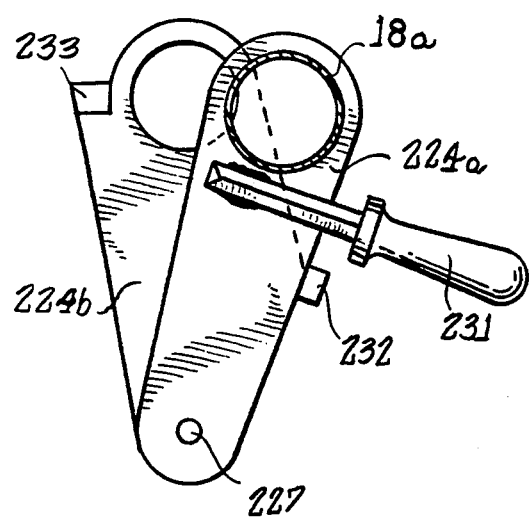
FIG.10
FIG.11  FIG.12

METHOD AND APPARATUS FOR ATTACHING CLEATS

This application is a continuation of application Ser. No. 580,933, filed Sep. 11, 1990, now abandoned.

BACKGROUND OF THE INVENTION

1. Field of the Invention

This invention relates to an apparatus and method for attaching cleats to belts, and more particularly, to an apparatus and method for heating cleats and belts to a fusing temperature and then rolling a wheel over the cleats.

2. Description of Related Art

It is known in the art to attach cleats to conveyor belts by heating portions of both the cleat and belt to a fusing temperature and employing a wheel or roller to press the heated cleat and belt together to fuse them. Cleats generally have a horizontal base with a stem extending upwardly therefrom. It is also known to provide a wheel which is slotted between its lateral sides to accommodate the stem portion of the cleat therein, with the perimeter of the wheel on either side of the slot pressing on the base portion of the cleat.

It is common for such cleat attachment to be done in batch-type operation, wherein cleats of different sizes, shapes and materials are attached in each batch run. Additionally, it is required to attach this variety of cleats both longitudinally, along the length of the belt, and transversely, across the width of the belt.

It was previously believed necessary to run the aforementioned variety of operations on separate machines with each machine designed to attach one particular type of cleat in one particular orientation. Or, in the alternative, a few of the various operations could be performed on a single machine, but only with extensive retooling between each type of operation.

Such transferring between machines and extensive retooling between each operation results in considerable undesired downtime. Thus, there is a need for a single machine capable of attaching various sizes and shapes of cleats to a conveyor belt, either longitudinally or transversely, with a minimum amount of adjustments and retooling between consecutive, varying operations.

It is common in conveyor belts to provide one or more V-guide cleats on the underside of the belt. The V-guide cleats run longitudinally along the entire length of the underside of the belt and are used to maintain alignment of the belt during the translational and rotational movements of its operation. Since the cleats on the topside of the belt run in a transverse direction, perpendicular to the V-guides, heretofore separate machines were required for attaching longitudinal V-guides and transverse cleats.

In addition to the large cost of maintaining separate machines to perform these two operations, this procedure has been found to be undesirable in that considerable production time is lost in transporting materials from one machine to the next. Therefore, there is a need for a single machine which can attach cleats both longitudinally, along the length of the belt, as well as transversely, across the width of the belt, with minimal tooling and equipment changeover.

Current machines used for attaching cleats have been found to suffer from numerous shortcomings in several other aspects as well. Most principally, current machines employ a chain drive to move the wheel, which presses the cleats and belt together, across the width of the belt and back again.

This arrangement causes non-uniform pressure exerted by the wheel as it traverses from one lateral side of the belt to the other. This uneven pressure across the width of the belt results in non-uniform adhesion of the cleats across the belt. Thus, there is a need for machines capable of exerting a constant force on the wheel between lateral sides of the belt, regardless of the position of the wheel therebetween.

Furthermore, since current machines employ a chain drive for the return stroke as well as the initial pressing stroke, the return stroke has been found to be undesirably slow, as limited by the speed of the chain drive. While a two-speed motor drive could be provided, such a drive adds to the machine cost. Current production speed of attaching many cleats to a belt is limited by the slow return movement of the carriage after attaching each cleat. Therefore, there is a need to provide machines with a more rapid return stroke of the wheel.

Another shortcoming of current cleat attachment machines is that the force or pressure exerted by the wheel on the cleat is dictated solely by the mass of the wheel, and the gravitational force thereof. There is no means for varying this force. In practice, a wide variety of materials are utilized for both cleats and belts. Some of these materials require greater clamping pressure to adhere securely to each other, and some require less pressure. Also, cleats come in a wide variety of sizes and shapes for use in particular applications. These varying cleats require varying pressures to assure their adherence to the conveyor belt. Therefore, there is a need to provide machines in which the force exerted by the wheel can be varied.

An additional shortcoming of current cleat attachment machines is their inability to accommodate "scooped" or angled cleats without warping or reducing the strength of the cleats. Scooped cleats consist of a generally flat, horizontal base and an oblique stem extending therefrom. Currently, in order to attach such scooped cleats, the entire cleat is heated to a temperature sufficient to permit its deformation. The cleat is subsequently passed through a straightening component which flexes the stem of the cleat until it is perpendicular with the base. The cleat is then immediately fed beneath the rolling wheel and passes therethrough in its straightened position. After leaving the wheel, the base now fused to the belt, the stem is left to naturally return to its angled position.

Such means for attaching scooped cleats results in undesirable strain and warping of the cleats due to the flexing thereof, and strain and warping stresses at the fused area. Therefore, there is a need for machines capable of attaching scooped cleats having a variety of angles between the base and stem to conveyor belts, without deforming the cleat in the process.

Lastly, as discussed above, in practice it is common to have cleats and belts of different material being attached in each batch run, with each material having a different melting point. Thus, to obtain optimal fusion between the cleats and belts, different heat requirements are desired for the cleats than for the belts, with different amounts of heat for each individual material being utilized as well. Current machines require extensive tooling and time-consuming adjustments in order to vary the heat imparted to the cleats and belts. Therefore, there is a need for a machine in which the heat imparted to the cleats and belts can be varied simply and quickly.

SUMMARY OF THE INVENTION

In accordance with the present invention, there is provided a cleat attachment apparatus capable of attaching cleats having various sizes, shapes and melting characteristics to a conveyor belt, either longitudinally or transversely, with a minimum amount of adjustments and tooling between consecutive, varying operations.

A hot air blower imparts heat to portions of both the cleats and belts until they become molten and fusible. The cleat is then immediately fed beneath a slotted wheel which rolls across the cleat, accommodating the upright stem portion of the cleat in the slot and pressing the horizontal base of the cleat against the belt therebeneath. This pressure fuses the cleat to the belt.

The wheel is attached to a carriage which is slidably mounted on a plurality of parallel shafts upon which it slides across the width of the belt. The aforementioned hot air blower, as well as the motor which drives the wheel, are attached to the carriage as well. In attaching cleats in a transverse direction across the width of the belt, the wheel is pressed down upon the cleat and driven by a motor so that it rolls along the cleat from one lateral side of the belt to the other, pressing the cleat against the belt as it rolls. This rolling action of the wheel drives the carriage along the parallel shafts on which it is slidably mounted.

The wheel of the present invention is easily pivoted between a longitudinal position, for attaching V-guide cleats along the length of the bottom side of a conveyor belt, and a transverse position, for attaching cleats across the width of the belt on its topside. This pivoting is accomplished with minimal adjustments and tooling, such that the wheel can be shifted from one position to the other in a matter of seconds.

In order to accommodate scooped or angled cleats, the wheel of the present apparatus can be moved to a tilted position, at various angles, preferably in the range of between 0° and 60° from the vertical plane as required, depending upon the angle of the stem with respect to the base. The wheel then rolls along the cleat in this slanted orientation with the stem accommodated in the slot in the perimeter of the wheel, and the wheel pressing down on the base portions on either side of the stem. This tilting between various angles can be accomplished quickly, with minimal tooling.

In accordance with one embodiment of the present invention, a hydraulic piston is attached to the wheel which forces the wheel down against the cleat as it rolls across the cleat. This piston pressure can be varied to impart greater or lesser force upon the cleat as needed, depending upon the adhesion characteristics of the particular type of cleat being attached. The piston also lifts the wheel off the cleat after completion of each cleat attachment. With the wheel lifted, the carriage is then free to slide along the shafts on which it is mounted. This allows the return stroke to be done manually and quickly, not limited by the speed of any driving mechanism.

Since parallel shafts are employed in this embodiment to slidably support the carriage, instead of chains as used in prior designs, and a hydraulic piston of variable pressure is employed to impart the desired force on the wheel, uniform pressure across the entire width of the belt can be maintained. Furthermore, the amount of this uniform pressure can be readily adjusted.

Additionally, in accordance with the present invention, the hot air blower is mounted on the carriage so as to be easily adjustable in each of three dimensions. This allows quick adjustments of both the proximity of the blower to the cleats and belt as well as adjustments of the direction in which the hot air blows, to allow the cleat to be heated more than the belt or vice versa, depending upon the particular fusing characteristics of the cleat and belt materials.

The cleat attachment apparatus of the present invention overcomes each of the aforementioned shortcomings of prior designs in a simple, inexpensive, and reliable apparatus which lends itself to economical fabrication.

Further advantages will become apparent as the description proceeds and the features of novelty which characterize this invention will be pointed out with particularity in the claims annex to and forming a part of the specification.

BRIEF DESCRIPTION OF THE DRAWINGS

In the drawings, wherein like elements are referenced alike,

FIG. 3 is a perspective view of the cleat attachment apparatus of FIG. 1, with the wheel shown in its longitudinal position;

FIG. 4 is an enlarged, fragmentary view of FIG. 3, particularly illustrating the adjustable mounting bracket which supports the sled and blower for attaching cleats longitudinally;

FIG. 5 is a cross-sectional, fragmentary view of one type of V-guide cleat shown attached to a conveyor belt;

FIG. 8 is an enlarged perspective view of the sled of FIG. 1;

FIG. 9 is a side view of the sled embodiment of FIG. 7;

FIG. 10 is an exploded view of the sled embodiment of FIG. 8;

FIG. 11 is an enlarged cross-sectional view of the hot air bypass valve taken along the line B—B of FIG. 2, shown in its closed position; and FIG. 12 is an enlarged cross-sectional view of the hot air bypass valve taken along the line B—B of FIG. 2, shown in its open position.

DETAILED DESCRIPTION OF THE PREFERRED EMBODIMENT

Figure 1:
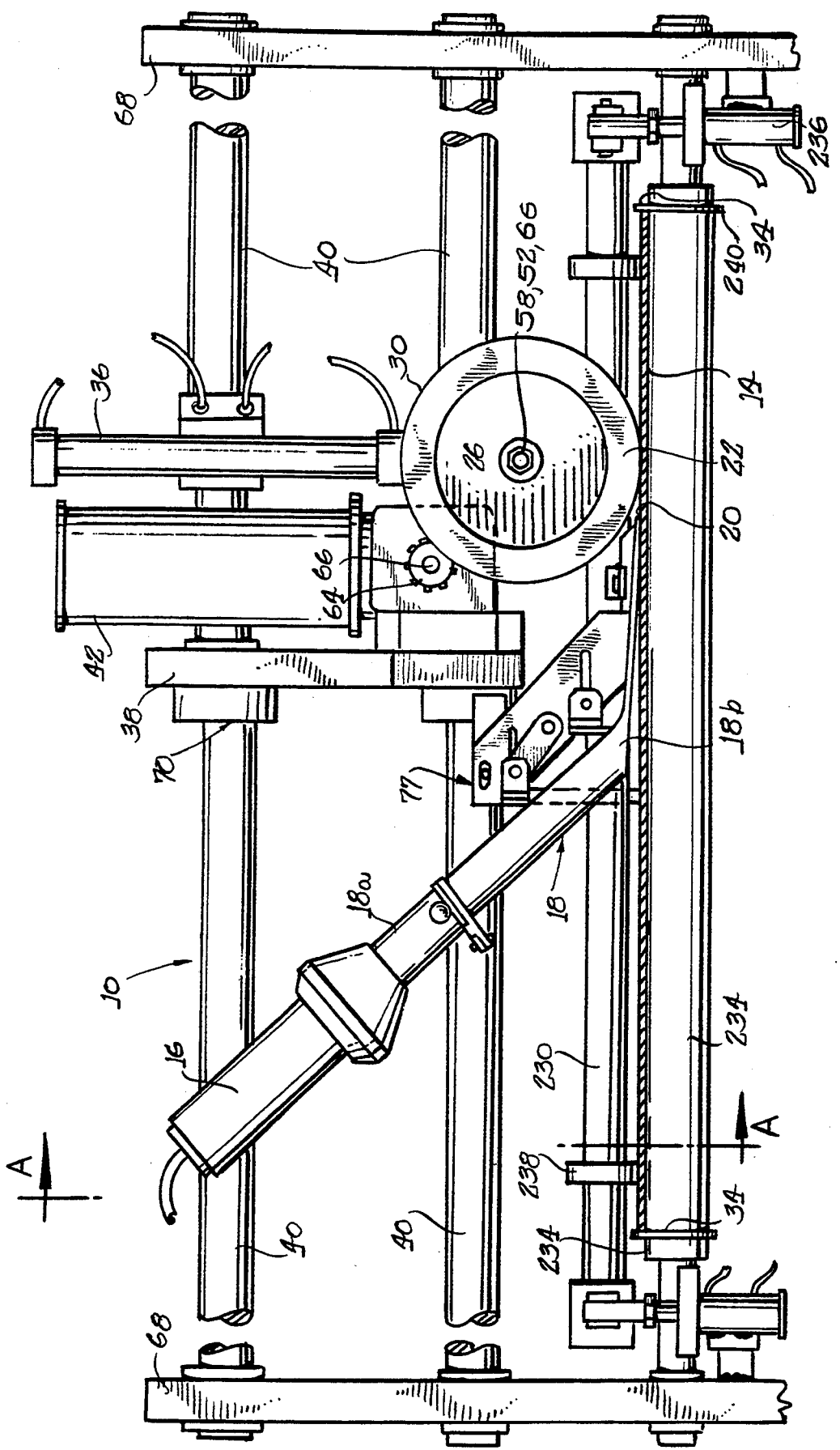
FIG. 1 is a perspective view of a cleat attachment apparatus embodying various features of the present invention, shown in its transverse position.

FIGS. 1-12 show preferred embodiments of a cleat attachment apparatus constructed in accordance with principles of the present invention. Referring initially to FIG. 1, the cleat attachment apparatus indicated generally at 10 is shown in its transverse position, whereby cleats are attached across the width of a conveyor belt.

Figure 2:
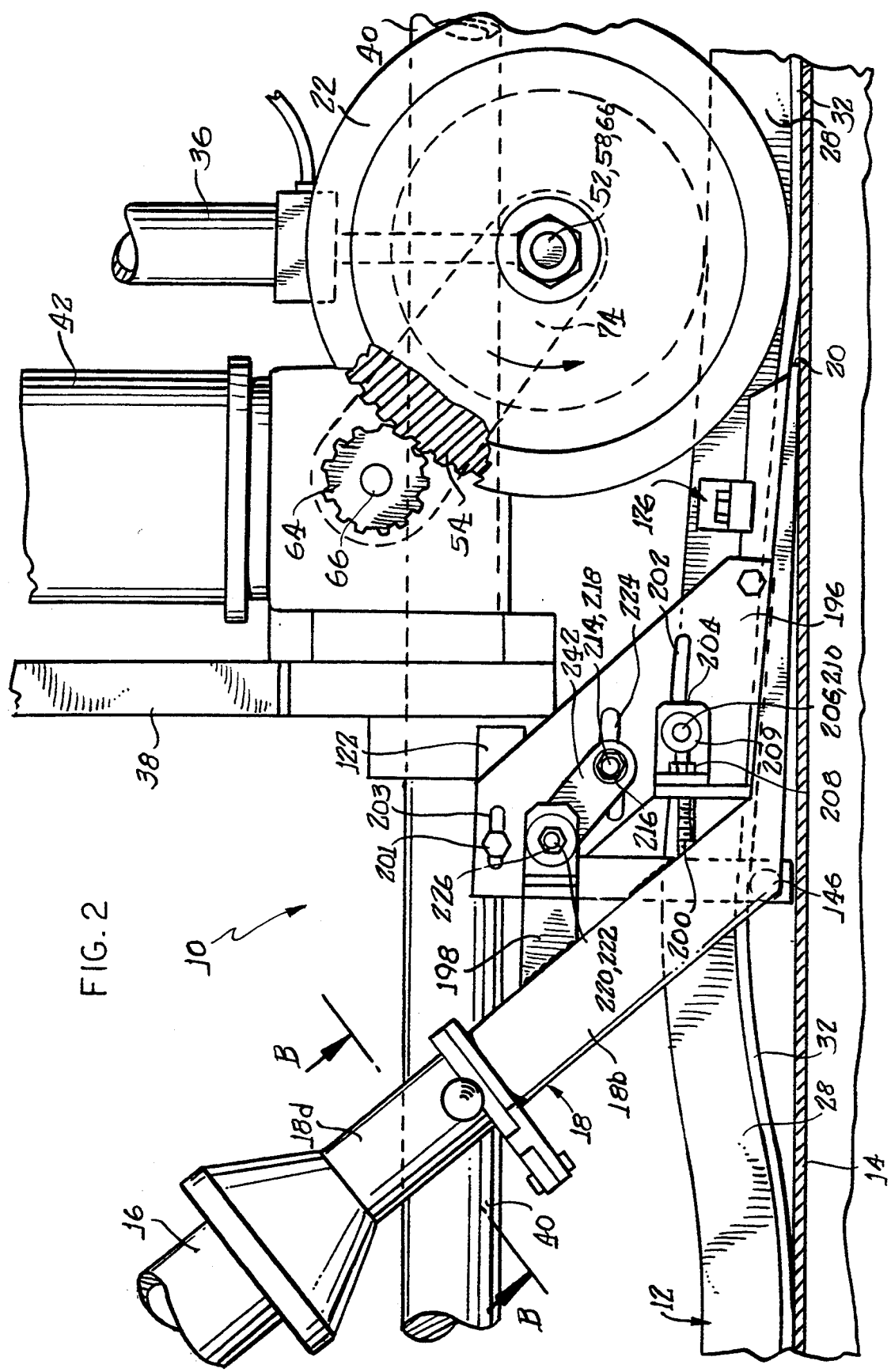
FIG. 2 is an enlarged, fragmentary view of the wheel and sled portion of the embodiment of FIG. 1, particularly illustrating the passage of a cleat therethrough.

Referring momentarily to FIG. 2, in order to heat the cleat 12 and conveyor belt 14 to their respective fusible temperatures, an electric hot air blower 16 blows hot air through a nozzle 18 having a reduced opening at its discharge end 20. The discharge end 20 of the nozzle 18 is directed such that hot air impinges simultaneously upon both the cleat 12 and conveyor belt 14. Subsequent to the cleat 12 and belt 14 being heated to their respective fusible temperatures, a wheel 22 is rolled across the cleat 12 pressing it against the conveyor belt 14 thereunder to fuse the two together.

The wheel 22 has a slotted portion 24 between its opposing lateral sides 26 which accommodates the upwardly-extending stem 28 of the cleat 12 while the perimeter 30 of the wheel 22 presses against the base 32 of the cleat 12.

To attach cleats 12 transversely across the width of the conveyor belt 14, a wheel 22 positioned with its lateral sides 26 perpendicular to the lateral sides 34 of the conveyor belt 14 is employed. (See FIG. 1) In current machines, the wheel 22 is driven by a chain and rolls along the heated cleat 12, traversing the conveyor belt 14 from one lateral side 34 of the belt to the other, pressing the cleat against the belt as it traverses.

Attachment of cleats longitudinally along the length of the conveyor belt 14 currently requires employment of a separate machine which provides a wheel 22 positioned with its lateral sides 26 parallel with the the lateral sides 34 of the conveyor belt 14. The conveyor belt 14 travels beneath the wheel 22 and rotates the wheel as it remains in a stationary position, generally centered between the belt lateral sides 34. A cleat 12 is heated and fed beneath the wheel 22 whereby it is fused to the corresponding heated portion of the belt 14 as the belt advances beneath the wheel. (See FIG. 3).

Due to the multiplicity of variable sizes, shapes, and materials of cleats 12 and conveyor belts 14 which the apparatus 10 must accommodate, it is required that such machines have versatility, which current machines lack.

In addition to requiring separate machines for attachment of longitudinal and transverse cleats, current machines require separated machines or extensive tooling to accommodate scooped or angled cleats. Even notwithstanding this extensive tooling, current machines cause undesirable strain and warping of scooped cleats due to flexing thereof, and strain and warping stresses at the fused area as well.

Also, the conventional cleating equipment suffers in its inability to provide added pressure to the wheel 22 and to the cleats 12 to cause better adhesion of the cleat material and belt material as the wheel traverses from one lateral side 34 of the conveyor belt 14 to the other. The chain drive of current machines is also undesirable in that it limits the speed of the return stroke of the wheel 22 after completion of the attachment of each transverse cleat.

Additionally, the hot air blower 16 attachment of current machines is not readily adjustable, as is required in order to account for the varying fusing characteristics of the different materials being run. Similarly, the differing fusing characteristics of each material being run require varying the pressure of hot air impinging thereon in order to obtain optimal fusion.

Furthermore, current machines suffer in their inability to vary the pressure exerted by the wheel 22 on the cleats 12. Cleats having a base 32 of small area require greater wheel forces to be secured to a conveyor belt 14 than do cleats having larger base areas.

Thus, there is a need for a new and improved machine for attaching cleats 12 which can accommodate cleats of varying shapes, sizes and materials and attach them to conveyor belts either longitudinally or transversely with few adjustments.

In accordance with the present invention, a cleat attachment apparatus 10 is provided with a wheel 22 which is readily pivotal between longitudinal and transverse positions, as well as tiltable with respect to a vertical plane. (See FIGS. 6 and 7). This pivoting ability provides a single machine 10 capable of attaching cleats 12 both longitudinally and transversely with little adjustment necessary in interchanging between the two positions. Providing means for tilting of the wheel 22 with respect to the vertical plane allows the machine to accommodate scooped cleats without the aforementioned problems associated with bending the cleats 12 prior to and during their attachment to the conveyor belt 14.

Also, in accordance with the present invention, the wheel 22 is raised and lowered by actuation of a hydraulic cylinder 36 connected thereto. The hydraulic cylinder 36 also acts to push the wheel 22 against the cleat 12 when the wheel is in its lowered position. Since the pressure in the hydraulic cylinder 36 can be variably controlled, different wheel pressures can be utilized for each run to accommodate the varying pressure requirements necessary to optimally fuse the varying materials.

Another feature associated with the present invention is heretofore unattainable speed in the return stroke. This is accomplished by mounting the wheel 22 on a carriage 38 which is slidable between the lateral sides 34. The carriage slides on two parallel shafts 40 which extend above the conveyor belt 14, generally perpendicular to the lateral sides 34 thereof. The wheel is rotated by an electric motor 42 which is also mounted on the carriage 38. Unlike the chain drive employed in previous machines, the present invention utilizes the action of the wheel 22 rolling against the cleat 12 to drive the freely slidable carriage 38 from one lateral side 34 of the conveyor belt 14 to the other as the wheel 22 rolls. Upon reaching the far lateral side 34 of the conveyor belt 14 at the completion of attachment of each cleat, the hydraulic cylinder 36 raises the wheel 22 so that it no longer abuts the cleat 12 and the carriage 38 is manually slid back above the conveyor belt 14 to its originating lateral side 34, and thus into position for attachment of the next cleat. This manual return has been found to be considerably faster than the previously employed chain drive return which had the same speed across the belt in each direction of travel.

A still further improvement associated with cleat attachment apparatus constructed in accordance with the present invention is the adjustability of the hot blower 16. The hot air blower 16 of the present invention is mountable on two different mounting brackets 44 and 46, for longitudinal and transverse cleat attachment, respectively. The respective mounting brackets each support respective hot air blower attachment arrangements which are suitable for allowing minute adjustments of the nozzle 18 both vertically, horizontally and angularly with minimal adjustments, so that the heat imparted to the cleat 12 and conveyor belt 14 can be accurately maintained and varied with changes in the materials being run. The hot air blower 16 is also of variable exhaust pressure to accommodate the differing depths from the surface of the cleats 12 and belts 14 to which heat needs to be imparted to obtain optimal fusion.

These and other improvements over prior designs are provided in cleat attachment apparatus constructed in accordance with the present invention. One embodiment of such cleat attachment apparatus is indicated generally at 10 in the drawings.

Figure 1A:
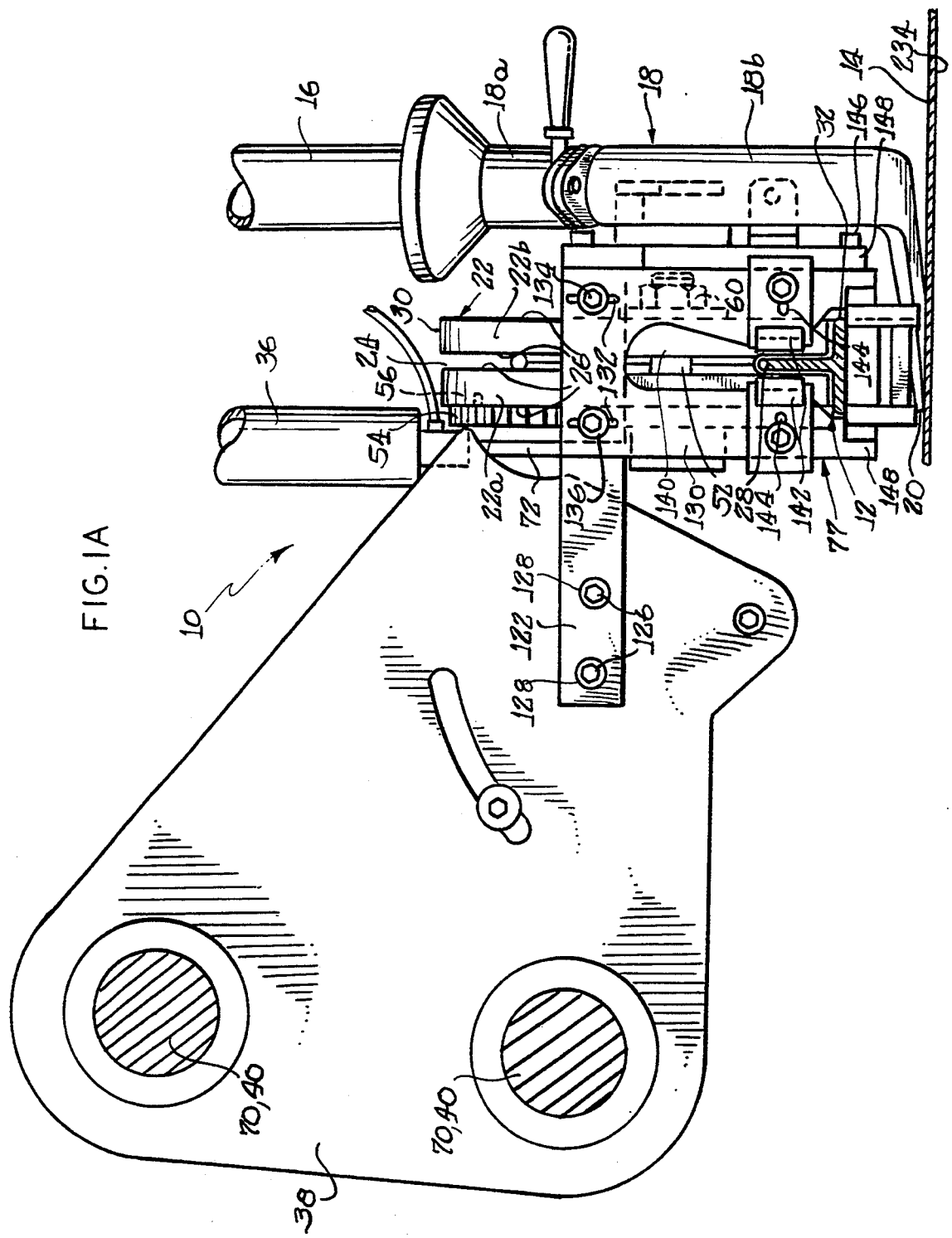
FIG. 1A is an enlarged perspective view of a cleat attachment apparatus taken along the line A—A of FIG. 1.

Referring to FIGS. 1, 1A and 2, cleat attachment apparatus 10 is shown in the transverse cleat attachment position. In order to attach cleats 12 transversely across the width of the conveyor belt 14, the wheel 22 is oriented with its lateral sides 26 perpendicular to the lateral sides 34 of the conveyor belt 14. As best seen in FIG. 2, the wheel 22 thus rolls along the top of the cleat 12 from one lateral side 34 of the conveyor belt to the other, pressing the cleat 12, which has been heated to a fusible temperature, down against the conveyor belt 14, which has also been heated to a fusible temperature, as it rolls.

In order to accommodate the stem 28 of the cleats 12, the wheel 22 has a slot 24 therein between its lateral sides 26, as seen in FIGS. 1A and 2. As best seen in FIG. 2, fusion between the cleat 12 and belt 14 is attained by the softened and heated cleat and belt material being simultaneously pressed together by the perimeter 30 of the wheel 22 on either side of the slot 24. Thus, there is a pressing down upon the base 32 of the cleat 12 on either side of the stem as the wheel 22 rolls across the cleat.

To provide for flexibility of the apparatus 10, the wheel 22 is removably attached so that wheels having different dimensions can be readily interchanged to accommodate cleats 12 of differing dimensions. In the embodiment of FIG. 1A, the slotted wheel 22 consists of a separate inner half 22a and outer half 22b spaced from one another along along an axle 52. The wheel 22 is driven by a bull gear 54.

As seen in FIG. 1A, the inner half component 22a of the wheel 22 is placed flush against the bull gear 54 which in turn is keyed to the axle 52 to rotate therewith. The inner half component 22a of the wheel 22 is rotated with the bull gear 54 by a nipple 56 which protrudes from the bull gear 54 and is received in a complementary countersink 58 in the side of the inner half 22a of the wheel 22. Thus, as the bull gear 54 rotates, the inner half 22a of the wheel 22 rotates therewith under the influence of the nipple 56 acting thereon. The inner half 22a of the wheel is retained flush against the bull gear 54 by a locking clip (not shown).

The outer half component 22b of the wheel 22 is driven by the axle 52. That is, as the bull gear 54 rotates, the axle 52 keyed thereto rotates with it. The axle 52 is provided with a threaded portion (not shown) at the end thereof distant from the bull gear 54. The outer half component 22b of the wheel has a complementary threaded aperture 58 through its center. Thus, the outer half 22b of the wheel is screwed onto the threaded portion of the axle 52 until the desired spacing from the inner half 22a is attained, thus forming a slotted portion 24 to accommodate the cleat stem 28. Thereafter, a locking nut 60 is screwed onto the threaded portion of the axle 52 and tightened against the outer half 22b of the wheel to both retain it in the desired position and secure it to the axle 52 so as to rotate therewith.

It is readily appreciated that other wheel embodiments are suitable as well. For instance, a single wheel 22 cast with a slot 24 already therein could be employed. However, such wheels do not provide the flexibility attainable with the aforementioned embodiment, particularly with respect to attachment of scooped cleats, as will be described later.

To drive the bull gear 54 and thus the wheel 22, an electric motor 42 is employed. In the embodiment depicted in the drawings, the electric motor 42 is positioned with its axis aligned vertically. Through a pair of bevel gears (not shown) a pinion gear 64 having a horizontal axis 66 is driven. As best seen in FIG. 2, the pinion gear 64 meshes with the bull gear 54 to drive the bull gear and thus the wheel 22.

In order to provide for movement of the wheel 22 from one lateral side 34 of the conveyor belt 14 to the other, the wheel 22, bull gear 54, pinion gear 64, and electric motor 42 are all mounted on a carriage 38 which is slidable between the lateral sides 34 of the belt 14.

The carriage 38 slides along two parallel cylindrical shafts 40 which are supported by the frame 68. The shafts 40 lie in a common vertical plane and extend across the width of the conveyor belt 14 perpendicular to the lateral sides 34 of the belt 14. The carriage 38 is provided with apertures 70 therein, which receive the shafts 40 therethrough. The apertures 70 in the carriage are provided with linear bearings (not shown) to allow for low friction sliding of the carriage 38 along the shafts 40.

The carriage 38 is driven from one side of the belt 14 to the other by the wheel 22 as it rolls along the cleat 12. That is, as the wheel 22 is driven by the electric motor 42, it rolls from one lateral side 34 of the belt 12 to the other and pulls the carriage 38 with it as it rolls.

Upon completion of attachment of a transverse cleat, the wheel 22 is at the lateral side 34 of the conveyor belt 14. In order to provide for a rapid return stroke of the wheel, the wheel 22 is elevated so that the carriage 38 can be manually slid back to its initial starting position.

The wheel 22 is elevated by a hydraulic cylinder 36 attached to the axle 52 upon which the wheel 22 is mounted. The hydraulic cylinder 36 is pivotally mounted on the carriage 38 in a generally vertical position with its piston arm 72 pivotally connected to the wheel axle 52. Thus, as the piston arm 72 is withdrawn into the cylinder 36, the wheel 22 is lifted to its raised position, removed from the cleat 12, thereby allowing free sliding of the carriage 38 along the parallel shafts 40 upon which it is supported. Conversely, as the piston arm 72 is extended, the wheel 22 is pivoted to its lowered position, whereat the wheel 22 rolls along the cleat 12 pressing down upon the cleat 12 to fuse it to the conveyor belt 14 therebeneath.

To maintain the pinion 64 and bull gear 54 in a meshed relationship during raising and lowering of the wheel 22, a connecting rod 74 is employed to rotate the axle 52 of the wheel 22 about the pinion axis 66. (See FIG. 2) The connecting rod 74 has apertures (not shown) therethrough near its two opposing ends, with one aperture centered about the pinion axis 66 and the other aperture centered about the wheel axle 52. Thus, the wheel axle 52 and pinion axis 66 are maintained at a constant distance from one another, thereby maintaining the pinion 64 and bull gear 54 at a constant distance from one another regardless of the rotational position of the connecting rod 74, or elevation of the wheel 22. Thus, the wheel 22 continually rotates, both in its elevated and lowered positions. This continual meshing arrangement minimizes wear on the gears.

To provide for accurate feeding of the cleats 12 into the wheel 22 when the wheel is in its transverse position, a sled assembly 77, which is removably attached to the carriage 38, is employed which properly orients the cleat 12 prior to entry beneath the wheel 22. The sled assembly 77 is discussed further, below.

It is important to focus the heat closely and directly ahead of the front of the wheel so as to soften the cleat and belt directly before they are pressed tightly to fuse to each other. In attaching cleats transversely across the width of the belt 14, the hot air blower 16, used to heat the cleat 12 and conveyor belt 14, is attached directly to the carriage 38. In attaching cleats 12 longitudinally along the length of the conveyor belt 14, the hot air blower 16 is attached to the sled assembly 77. The adjustable attachment of the sled assembly 77 and hot air blower 16 is discussed further, below.

While the aforementioned discussion has addressed the attachment of cleats in a transverse direction, apparatus constructed according to principles of the present invention lend themselves to attachment of cleats longitudinally along the length of a conveyor belt as well, with little adjustment required in alternating between longitudinal and transverse positions. As discussed, it is common to attach a V-guide cleat (see FIG. 5) longitudinally along the length of the underside of a conveyor belt to maintain alignment of the conveyor belt 14 during its operation (see FIGS. 3 and 4), and then transfer to a transverse position to attach cleats transversely across the width of the topside of a conveyor belt 14.

Figure 7:
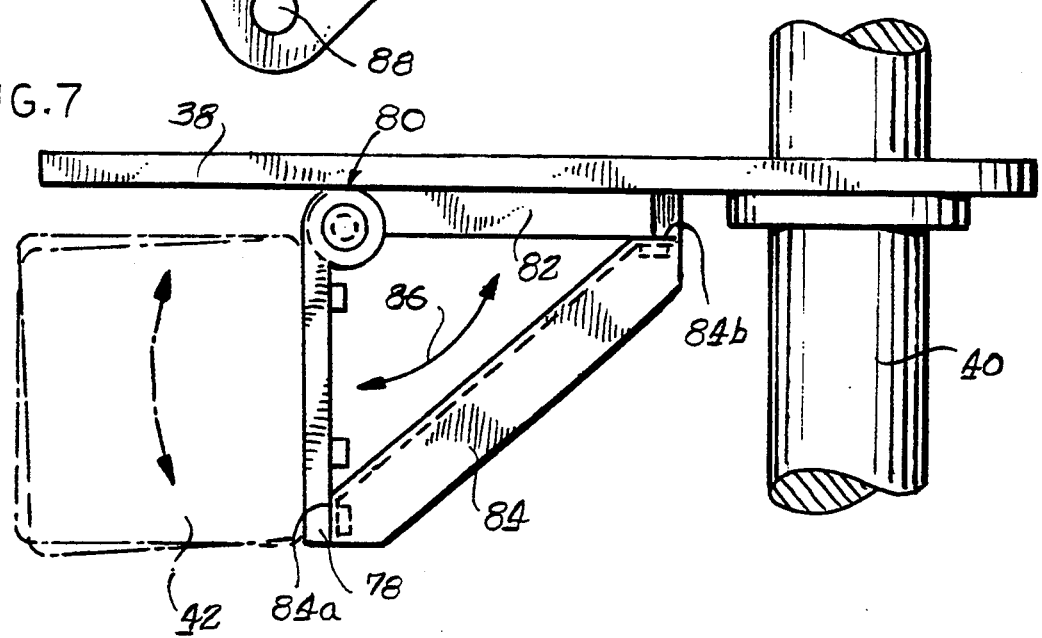
FIG. 7 is an enlarged, fragmentary top view of the embodiment of FIG. 1, illustrating the wheel and drive mechanism pivoted to the longitudinal position.

To transfer between longitudinal and transverse cleat attachment positions, the wheel 22 is pivotal upon the carriage 38. As best seen in FIG. 7, the wheel along with its associated bull gear, pinion gear, electric drive motor 42 and hydraulic cylinder are attached to a pivotal flange 78 and pivot as a unit.

The pivotal flange 78 pivots upon a hinge 80 between a longitudinal position (as shown in FIG. 7) wherein the pivotal flange 78 is perpendicular to the lateral sides of the conveyor belt, and a transverse position in which the pivotal flange 78 is parallel with the lateral sides of the conveyor belt. The hinge 80 is mounted on a carriage flange 82 which is integral with the carriage 38 extending generally parallel to the lateral sides of the conveyor belt.

To secure the pivotal flange 78 in its longitudinal position, perpendicular to the carriage flange 82 and perpendicular to the lateral sides of the conveyor belt, an angle bracket 84 is employed. As shown in FIG. 7, the opposing ends 84a and 84b of the angle bracket 84 are removably attached to the pivotal flange 78 and carriage flange 82, respectively. In this position the lateral sides of the wheel are generally parallel to the lateral sides of the conveyor belt.

To change to the transverse position, the angle bracket 84 is removed and the pivotal flange 78 is pivoted on the hinge 80 in the direction of the arrow 86 until it is adjacent the carriage flange 82, whereat the two flanges 78 and 82 are bolted together. In this position the lateral sides of the wheel are generally perpendicular to the lateral sides of the conveyor belt. Accordingly, the wheel 22 is readily interchangeable between longitudinal and transverse positions with minimal retooling.

To attach scooped or angled cleats to a conveyor belt 14, the wheel 22 is tiltable with respect to the vertical plane to correspond to the angle of the cleat stem 28. That is, to accommodate the stem portion 28 of the cleat 12 within the slot 24 in the wheel 22 as the wheel 22 rolls along the cleat 12, the wheel 22 with its associated bull gear 54, pinion gear 64, electric drive motor 42 and hydraulic cylinder 36 is tilted with respect to the vertical plane. (see FIG. 6) Thus, cleats 12 can enter the wheel 22 in their natural, undeformed state.

To facilitate the aforementioned tilting of the wheel 22 with respect to the vertical plane, the carriage flange 82 is pivotal about a carriage pivot pin 88. The angular orientation with respect to the vertical plane is maintained by tightening the retaining bolt 89 which passes through an aperture 90 in the carriage flange and an arcuate slot 92 in the carriage 38.

Figure 6:
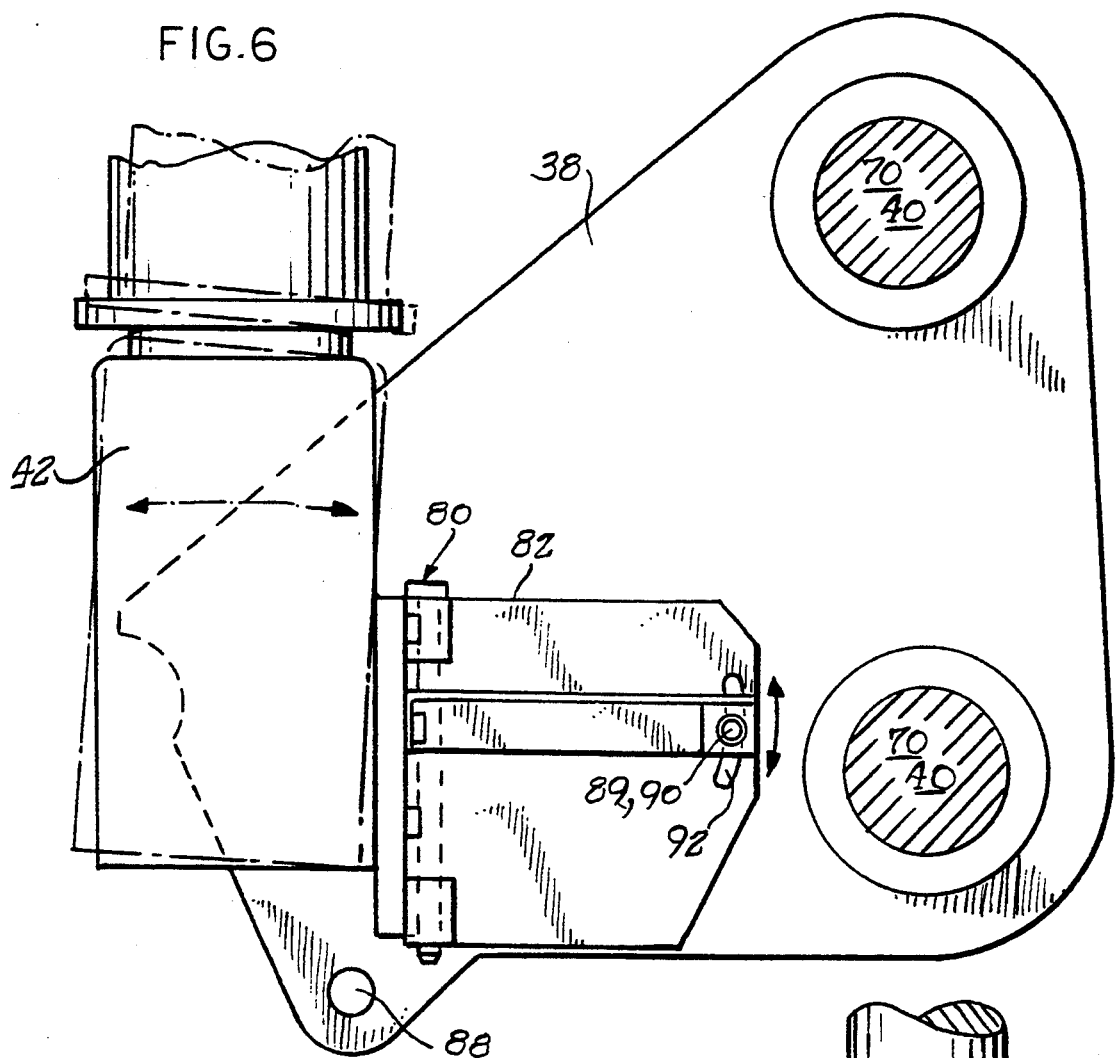
FIG. 6 is an enlarged, fragmentary side view of the embodiment of FIG. 1, illustrating the tilting of the wheel and drive mechanism with respect to the vertical plane.

With reference to FIG. 6, as the wheel is oriented more vertically, the bolt 89 is pivoted to a position lower in the arcuate slot 92; likewise, as the wheel 22 is oriented more obliquely with respect to the vertical plane the bolt is pivoted to a position higher within the arcuate slot 92. Accordingly, the wheel 22 is tilted to the desired angle to accommodate the angle of the particular scooped cleats being run by tightening the bolt 89 to the desired position within the arcuate slot 92. Generally, the arcuate slot 92 should be of sufficient length to allow tilting of the wheel 22 between 0° and 60° with respect to the vertical plane, although it is appreciated that accommodation for other orientations may be easily made as well.

To provide a generally equivalent force to the base 32 of the scooped cleat 12 on opposing sides of the stem 28 when the wheel 22 is in its tilted position, a wheel having a larger inner half 22a than outer half 22b should be employed. That is, as the wheel 22 is tilted with respect to the vertical plane, the outer half 22b of the wheel is moved closer to the conveyor belt 14 than the inner half 22a of the wheel. Thus, specially sized wheels having a larger inner half 22a than outer half 22b are employed wherein the diameter of the inner and outer halves of the wheel 22 are dimensioned such that the perimeters of both the inner half 22a and outer half 22b contact the cleat base 32 when the tilted wheel 22 is in its lowered position. Different sizes of wheel halves 22a and 22b are employed depending upon the angular orientation required. With this wheel design, the wheel 22 rolls along the cleat 12 at a constant, predetermined angle thereby accommodating the angled cleat stem 28 in the slot 24 between the inner and outer wheel halves 22a and 22b, while applying a constant pressure to the cleat base 32 on opposing sides of the stem 28.

Returning momentarily to the previous discussion of the different equipment employed in attaching cleats longitudinally as opposed to transversely, it is seen in comparing FIGS. 2 and 3 that different means are employed in attaching the hot air blower 16 to the carriage 38. Also, it is seen in comparing FIGS. 2 and 3 that for attachment of cleats in the transverse direction, a sled assembly 77 is employed to accurately feed the cleats into the wheel 22, whereas no sled assembly is employed in attaching cleats longitudinally.

In attaching cleats longitudinally along the length of the conveyor belt, the hot air blower 16 is attached directly to the carriage 38 in such manner that its position is easily adjustable both laterally, vertically and angularly to accurately impart hot air to the cleat 12 and conveyor belt 14 to maximize fusion. As seen in the embodiment of FIGS. 3 and 4, the hot air blower 16 is attached to the carriage 38 by a plurality of slidably adjustable plates or brackets.

With reference to FIG. 4, in order to easily adjust the angular orientation of the hot air blower 16 it is pivotally attached to an L-bracket 94 by a connecting pin 96 extending through the L-bracket aperture 98 and the hot air blower aperture 100. The connecting pin 96 is provided with means for locking the pin in a stationary position within the L-bracket aperture 98, such as a locking nut, to prevent rotation of the hot air blower 16 therein. Accordingly, the hot air blower 16 can be rotated in the direction of the arrows 103 to any desired angular orientation and maintained stationary at the desired orientation.

Referring to FIG. 4, to adjust the proximity of the hot air nozzle 18 in relation to the wheel 22, that is, horizontally in the direction of horizontal arrows 105, the horizontal leg 102 of the L-bracket 94 is provided with two horizontal adjustment slots 104. Horizontal adjustment nuts 106 having associated washers 108 extend through the horizontal adjustment slots 104 and act to secure the L-bracket 94 at the desired horizontal position.

Referring to FIG. 4, to adjust the vertical position of the hot air nozzle 18 in the direction of the vertical arrows 110, a vertical adjustment plate 112 is employed. The vertical adjustment plate 112 is provided with two vertical adjustment slots 114. Vertical adjustment nuts 116 having associated washers 118 extend through the vertical adjustment slots 114 and are threadably received into a blower attachment block 120 which is removably attached to the carriage 38. The blower attachment block 120 is not employed in attaching transverse cleats, as will be discussed below.

Accordingly, the vertical position of the hot air blower 16 is maintained by positioning the vertical adjustment plate 112 at the desired position and tightening the vertical adjustment nuts 116 into the blower attachment block 120. That is, the horizontal adjustment nuts 106 are threadably received in the vertical adjustment plate 112 such that the L-bracket 94 and the hot air nozzle 18 attached thereto are translated vertically as the vertical adjustment plate 112 is translated in the direction of the vertical arrows 110.

The aforementioned arrangement depicted in FIGS. 3 and 4 for adjusting the hot air blower 16 has been found to provide quick and accurate positioning of the hot air blower 16. This allows a user to accurately locate the hottest air to melt the cleat and belt materials for fusion when attaching cleats 12 longitudinally along the length of the conveyor belt 14. A different arrangement has been found to be more advantageous in attaching cleats 12 transversely across the width of the conveyor belt 14.

As previously discussed, a sled assembly 77 is employed in attaching cleats 12 transversely to align the cleat 12 prior to entry into the wheel 22, as shown in FIGS. 1, 1A and 2. In this arrangement, the blower 16 is attached to the sled assembly 77 which, in turn, is attached to the slidable carriage 38. Thus, both the sled 77 and blower 16 traverse between the belt lateral sides 34 along with the wheel 22 as the carriage 38 upon which they are mounted traverses across the width of the belt 14. The sled assembly 77 provides accurate positioning and alignment of the cleat 12 prior to passage of the cleat 12 beneath the wheel 22. While the sled assembly 77 is comprised of a number of components, the sled assembly 77 is attached and removed as a single unit with the hot air blower 16 attached thereto.

With reference to FIG. 1A, the sled assembly 77 is removably attached to the carriage 38 by a horizontal attachment component 122 of the sled 77. One or more attachment apertures are provided in the sled attachment component 122 aligned with one or more threaded bores (not shown) in the carriage 38, such that tightening of threaded sled attachment nuts 126, with their associated washers 128, passing through the attachment apertures 124 secures the sled attachment component 122 to the carriage 38 in a stationary position.

The remainder of the sled assembly 77 depends from this sled attachment component 122. With continued reference to FIG. 1A, a cleat 12 enters the sled assembly 77 through a vertical frame 130 which is provided with two sled height adjustment slots 132 near the upper end thereof for adjusting the height of the sled assembly 77 with respect to the conveyor belt 14. Two sled height adjustment nuts 134 having corresponding washers 136 pass through the sled height adjustment slots 132 and are threadably received into two threaded bores in the attachment component 122. Thus, tightening of the sled height adjustment nuts 134 secures the vertical frame 130 to the horizontal sled attachment component 122 at the desired height within the slots 132.

With further reference to FIG. 1A, it is seen that the vertical frame 130 is generally U-shaped with the central opening 140 therein enlarged near its upper end to accommodate the aforementioned scooped or angled cleats. Also, as seen in FIG. 1A the lower end of the vertical frame 130 is enlarged also, so as to accommodate the base 32 of the cleat.

Lateral rollers 142 are provided on either side of the central opening 140 to orient the cleat 12 to the desired position as it enters the sled assembly 77. That is, as the cleat 12 enters the sled assembly 77 through the vertical frame 130, lateral rollers 142 act on opposing sides of the cleat stem 28 to maintain it in the desired position. The lateral rollers 142 are provided with slots 144 so that the space between the two rollers 142 can be varied as needed to accommodate cleat stems 28 of different thicknesses.

In attaching "straight" cleats, the lateral rollers 142 are generally oriented with their axes of rotation vertical so that the stem 28 is oriented vertically, as desired for accommodation of the stem 28 in the slotted portion 28 of the wheel. In attaching scooped cleats, the lateral rollers 142 are both rotated clockwise, as viewed from FIG. 1A, until their axes of rotation are oriented at the same angle as the cleat stem 28. This allows scooped cleats to enter the sled assembly 77, and subsequently enter the wheel 22, without deforming the stem 28 thereof, as was required with previous designs.

The remainder of the sled assembly 77 is pivotally attached to the bottom end of the vertical frame 130. A sled pivot pin 146 extends from one vertical arm 148 of the vertical frame 130 to the other. The sled pivot pin 146 pivotally supports a horizontal sled frame 150 and a depending roller frame 152 thereon.

With reference to FIG. 8, the arrangement of the vertical arm 148 of the vertical frame, horizontal sled frame 150, and depending roller frame 152 about the sled pivot pin 146 is illustrated. In this arrangement, each of the aforementioned frames 130, 150, and 152 freely pivots about the sled pivot pin 146.

To allow for easy sliding of the cleat 12 through the sled assembly 77, the sled pivot pin 146 is provided with a supporting roller 153. The supporting roller 153 is essentially a cylindrical sleeve which rotates about the sled pivot pin 146. Cleats 12 roll across the supporting roller 153 which supports the cleat 12 beneath its base 32 as it passes through the sled assembly 77.

The horizontal sled frame 150 is employed to more accurately position cleats 12 just prior to their being heated and fed into the wheel 22. The horizontal sled frame 150 consists of a single cast piece which is best seen in FIG. 10. Two generally parallel slats 154 are formed integral with three cross webs 156, 158 and 160 connecting the slats. The horizontal sled frame 150 is provided with two protrusions 161 at its proximal end 164 through which the sled pivot pin 146 passes to pivotally connect the horizontal sled frame 150 to the vertical frame 130. (See FIG. 8).

A nozzle support cross web 156 extends from one distal end 162 of the horizontal sled frame 150 to the other. A structural support cross web 158 extends from one slat 154 to the other, approximately midway between the proximal end 164 and distal end 162 of the horizontal sled frame 150. This web 158 is optional, but provides structural support to the frame 150 to reduce fatigue stress in the frame 150 associated with repeated passage of cleats 12 therethrough.

A proximal end cross web 160 extends from one proximal end 164 of the horizontal sled frame 150 to the other. The proximal end cross web 160 is provided with a threaded aperture 166 therein which threadably receives a traversing roller height adjustment screw 168 for adjustment of the height of the depending roller 152 in relation to the roller frame 152 and conveyor belt 14 as discussed further, below.

To assist in centering the cleat 12 as it passes over the horizontal sled frame 150, the horizontal sled frame 150 further includes raised portions 170 on the slats 154 at the proximal end 164 of the sled frame 150 between which the cleat 12 passes. To further assist in maintaining centering of the cleat 12, sled rollers 176 are provided on the opposing sides of the horizontal sled frame 150. Threaded apertures 173 are provided on the topside 174 of the slats 154 which threadably receive sled roller nuts 177 which secure the rollers 176 to the horizontal sled frame 150. As seen in FIG. 8, sled rollers 176 have a sled roller adjustment slot 172 for varying the distance between opposing sled roller wheels 180 to accommodate cleat stems 28 of varying thicknesses, similar to the lateral rollers 142 discussed above.

Thus, in operation the cleat 12 enters the sled assembly 77 through the central opening 140 in the vertical frame 130. The lateral rollers 142 act on opposing sides of the cleat stem 28 to orient the cleat 12 in the desired position as it passes through the vertical frame 130. The base 32 of the cleat 12 is supported by and rolls atop the supporting roller 153 as it passes through the sled assembly 77. The cleat 12 then reaches the sled rollers 176 whereat the stem 28 of the cleat 12 passes between the sled rollers 176 which helps maintain centering of the cleat 12, and the base 32 of the cleat 12 passes beneath the sled rollers 176 such that the sled rollers 176 keep the cleat 12 lowered. Finally, as the cleat leaves the distal end 162 of the horizontal sled frame 150, the base 32 of the cleat passes directly over the discharge end 20 of the hot air nozzle 18 whereat it is heated to a fusible temperature along with the portion of the conveyor belt 14 therebeneath. The cleat 12 then subsequently passes beneath the wheel 22 whereat it is pressed against the conveyor belt 14 and thereby attached.

A roller frame 152 supports a traversing roller 186 which is provided to apply pressure to the top surface of the conveyor belt 14 which causes the belt to lay flat as the cleat 12 is applied. Turning of an adjustment screw 168 allows the depending roller frame 152 to be raised or lowered as desired to accommodate belts 14 of different thickness, as described further, below. The traversing roller 186 also serves to prevent the horizontal sled frame 150 from catching on the lateral sides 34 of the belt 14 as the horizontal sled frame 150 traverses from one lateral side 34 of the belt 14 to the other.

As seen in FIG. 10, the depending roller frame 152 is provided with two elbows 182 whereat the depending roller frame 152 is pivotally attached to the sled pivot pin 146, as previously mentioned. A traversing roller 186 is rotatably attached to the distal end 184 of the depending roller frame 152. Thus, with the horizontal sled frame 150 pivotally connected to the sled pivot pin 146 and the depending roller frame 152 also pivotal thereabout and positioned beneath the horizontal sled frame 150, the traversing roller 186 rests on and rolls across the conveyor belt 14 supporting the horizontal sled frame 150 thereabove and pressing the belt 14 flat.

Springs 188 are provided between the horizontal sled frame 150 and the depending roller frame 152 to cushion the support of the sled frame 150 upon the roller frame 152. The springs 188 are received in spring receiving slots 190 on the topside 192 of the depending roller frame 152. As seen in FIG. 9, the springs 188 act upon the proximal end cross web 160 to support the horizontal sled frame 150.

As noted previously, a traversing roller height adjustment screw 168 is threadably received in the threaded aperture 166 in the proximal end cross web 160 to increase or decrease the height of the depending roller frame 152 by respectively screwing in the adjustment screw 168 and unscrewing the adjustment screw 168. Thus, the adjustment screw 168 is tightened to elevate the depending roller frame 152 as needed to accommodate belts of varying thickness.

Lastly, the horizontal sled frame 150 is provided with threaded lateral apertures 194 for attachment of the hot air blower nozzle 18 thereto. With reference to FIG. 2, a nozzle attachment plate 196 is employed for attaching the nozzle 18 to the sled assembly 77.

In order to attach the nozzle 18 to the nozzle attachment plate 196, the nozzle is provided with an upper attachment arm 198 and lower attachment arm 200 as seen in FIG. 2. The nozzle attachment plate 196 is, in turn, attached to the horizontal sled attachment component 122 of the sled assembly 77 so that the nozzle 18 traverses along with the sled assembly 77 on the carriage 38. The nozzle attachment plate 196 is attached to the horizontal sled attachment component 122 by a threaded plate attachment member 201 which passes through a plate attachment slot 203 at the upper end of the nozzle attachment plate 196 and is threadably received in the horizontal sled attachment plate 122 as seen in FIG. 2.

To provide for simple adjustment of the lower end of the nozzle 18, the lower attachment arm 200 thereof is attached to the nozzle attachment plate 196 through an L-shaped nozzle connecting member 204 having apertures 206 therein. With reference to FIG. 2, one aperture 206 of the connecting member 204 is slid onto the lower attachment arm 200 with a securing nut 208 threadably received on the connecting arm and tightened thereon to secure the L-shaped nozzle connecting member 204 to the lower attachment arm 200. The other aperture of the L-shaped nozzle connecting member 204 receives a threaded lower pin 210 therethrough which pin also extends through a lower plate slot 202. A threaded lower clamping nut 209 is threadably received on the threaded lower clamping pin 210 such that tightening of the lower clamping nut 209 secures the lower clamping pin 210 in the desired position within the lower plate slot 202. With this arrangement, the lower end of the nozzle 18 can be readily positioned as desired for each application.

With continued reference to FIG. 2, the upper attachment arm 198 of the nozzle 18 is also connected to the nozzle attachment plate 196 in a manner which provides for easy adjustment of the blower nozzle 18 both laterally and angularly. To provide for lateral and angular positioning of the upper end of the nozzle 18, a linking member 212 is pivotally connected at one of its ends to the nozzle attachment plate 196 by a threaded linking pin 214 which extends through both the upper plate slot 224 and the proximal aperture 218 in the linking member 212. A linking nut 216 is threadably received on the linking pin 214 and tightened to secure the linking pin 214 in the desired position within the upper plate slot 224 and at the desired angle with respect to the upper plate slot 224.

The linking member 212 is pivotally attached at its opposing end to the upper attachment arm 198 of the nozzle 18 so as to pivotally join the upper attachment arm 198 to the nozzle attachment plate 196. The distal aperture 220 in the linking member 212 receives a threaded positioning pin 222 therethrough which pin also extends through the upper attachment arm 198. An upper clamping nut 226 is threadably received on the positioning pin 222 such that tightening of the upper clamping nut 226 secures the upper attachment arm 198 at the desired angle with respect to the linking pin 214. Thus, by adjustment of the linking pin 214, positioning pin 222, and lower clamping pin 210, the nozzle 18 can be accurately adjusted to the desired position.

In practice, the upper and lower ends of the nozzle 18 are positioned as desired to impart the necessary heat to the cleat base 32 and conveyor belt 14 so that both are heated to their respective optimal fusing temperatures. After the nozzle 18 is positioned as desired, the aforementioned traversing roller height adjustment screw 168 is rotated as needed to elevate the depending roller frame 152 so that it applies sufficient pressure to the conveyor belt 14 to cause it to lie flat as the cleat is attached.

Due to the proximity of the nozzle 18 in relation to the conveyor belt 14, it is necessary to provide means for interrupting the flow of hot air through the nozzle during periods in which the carriage 38 and conveyor belt 14 are stationary with respect to one another, so that the belt is not overheated. To allow for interruption of the hot air through the nozzle 18, the nozzle is split into an upper half 18a and lower half 18b which an be pivoted into and out of registration with one another to respectively allow or interrupt the air flow through the lower half of the nozzle 18b. The lower half 18b of the nozzle is mounted to the carriage 38 in a stationary position, as discussed below.

As best seen in FIGS. 11 and 12, the upper half 18a of the nozzle is pivotal about a nozzle pivot pin 227 into and out of registration with the lower half 18b of the nozzle. That is, the adjoining ends of the upper and lower halves 18a and 18b of the nozzle 18 are respectively secured by pivoting plates 229a and 229b which pivot about the nozzle pivot pin 227 to pivot the upper and lower halves of the nozzle into and out of registration with one another. A pivoting handle 231 is welded to the upper pivoting plate 229a to allow for easy pivoting of the nozzle halves. Also, stopping blocks 232 and 233 are provided on the lower pivoting plate 229b to stop pivoting of the upper pivoting plate 229a in the clockwise direction when disengagement of the nozzle has been achieved (see FIG. 12), and in the counterclockwise direction when the nozzle halves are in registration (see FIG. 11). This nozzle arrangement allows for quick interruption of the air flow through the nozzle 18 which may be required should operations be interrupted for any reason.

The aforementioned components and characteristics for attaching cleats 12 to conveyor belts 14 having been described, the means for advancement of the conveyor belt 14 to the desired position at which such cleats 12 are to be attached will now be described.

The conveyor belt 14 is advanced in a different manner depending upon whether cleats 12 are being attached longitudinally or transversely. With reference to FIG. 1, the frame 68 which supports the cleat attachment apparatus 10 also supports the conveyor belt advancement apparatus. The conveyor belt 14 is placed between an upper advancement roller 230 and a lower advancement roller 234. To allow for insertion of the conveyor belt 14 therebetween, the upper advancement roller 230 is raised and lowered in relation to the lower advancement roller 234 by hydraulic lifting cylinders 236 attached to the ends of the upper advancement roller 230. Annular rings 238 are secured to the upper roller 222 near the lateral sides 34 of the conveyor belt 14.

To advance the conveyor belt 14 when the apparatus 10 is in its transverse cleat attachment arrangement, the upper advancement roller 230 is moved to its lowered position as shown in FIG. 1 whereby the annular rings 238 thereon are lowered onto the conveyor belt 14. The conveyor belt 14 is thereby pressed between the annular rings 238 and the lower advancement roller 234. The pressing on either side of the conveyor belt 14 by both the annular rings 238 and lower advancement roller 234 forces the belt to be advanced as the lower advancement roller 234 is rotated. In attaching cleats transversely, the wheel 22 is in its transverse position as shown in FIG. 1, whereat it is positioned directly above a flat working surface 239. Accordingly, in attaching cleats transversely the wheel 22 rolls across the flat working surface 239 as it traverses from one lateral side 34 of the conveyor belt 14 to the other.

Thus, in attaching cleats 12 transversely across the width of the conveyor belt 14, the belt 14 is advanced by rotation of the lower advancement roller 234 through a drive motor (not shown) between successive transverse cleat attachments That is, after attachment of a transverse cleat 12 the wheel 22 is raised as discussed above. Thereafter, the drive motor advances the conveyor belt 14 to the desired position for attachment of the next vertical cleat 12. Subsequently, the wheel 22 is lowered again and the next transverse cleat 12 is attached.

In order to assure that the conveyor belt 14 is retained at the center of the rollers 230, 234, annular retaining rings 240 are provided on the lower advancement roller 234 positioned so as to abut the lateral sides 34 of the conveyor belt 14.

In attaching cleats 12 longitudinally, as required for V-guide cleats, the wheel 22 is pivoted to its longitudinal position at which it is then positioned directly above a forward roller 242. (see FIG. 3). The belt 14 is advanced by the simultaneous action of both the lower advancement roller 234 and forward roller 242. That is, the belt is simultaneously advanced at the leading end of the apparatus by the downward force of the annular rings 238 of the upper advancement roller 230 pressing against the lower advancement roller 234 with the belt therebetween, as described above in relation to attachment of transverse cleats, and the belt is advanced at the wheel 22 by the downward force of the wheel 22 pressing against the forward roller 242 with the belt 14 therebetween.

The lower advancement roller 234 and the forward roller 242 are driven by a common variable speed drive motor through a chain linkage (not shown) such that equal surface speeds are attained by the lower advancement roller 234 and forward roller 242, to provide accurate and uniform advancement of the belt 14 through the apparatus. The wheel 22 is driven by a separate, independent drive motor 42.

The variable speed of the forward roller 242 provides a heretofore unattainable advantage. By varying the surface speed of the forward roller 242 in relation to the wheel 22, it is possible to induce a slight curvature in the belt 14 upon attachment of cleats thereto. This curvature can be made convex or concave to suit the specific application. A faster surface speed on the forward roller 242 in relation to that of the wheel 22 will result in an upward curvature in the belt 14 (as viewed in FIG. 3) as it exits the wheel 22; accordingly, a slower surface speed on the forward roller 242 in relation to that of the wheel 22 results in a downward curvature. In operation, it is usually desirable to provide upward curvature to the belt 14 when attaching V-guide cleats 12 so that minimal deformation is encountered as the belt 14 passes around its supporting rollers. This results in significantly reduced strain in the V-guide belt during operation in comparison to non-curved belts, thereby providing increased belt life.

In applications wherein a V-guide cleat (FIG. 5) has been attached to the underside of a conveyor belt 14 and transverse cleats are to be attached to the topside of that conveyor belt 14, as discussed above, the flat working surface 239 and forward roller 242 are separable approximately midway between the ends thereof to accommodate the V-guide cleat therein as the belt advances. This allows the conveyor belt to rest flat against the flat working surface 239 across the entire width of the belt 14, without the belt being raised at its center due to the V-guide cleat thereat. Accordingly, uniform pressure can be applied to a transverse cleat from one lateral side 34 of the conveyor belt 14 to the other.

While the invention has been described with reference to a preferred embodiment, it will be understood to those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for attaching cleats having a horizontal base and upwardly extending stem to conveyor belts extending a longitudinally direction and having lateral sides which are extending longitudinally, comprising:
   a frame;
   a carriage movable on said frame transversely across the conveyor belt;
   a carriage support means on the frame on which said carriage traverses between said conveyor belt lateral sides;
   wheel means on said carriage for applying pressure to said cleat horizontal base;
   blower means on said carriage for impinging hot air upon both said conveyor belt and said cleat base to heat the cleat and conveyor belt to a fusible temperature that causes the cleat and belt fuse together upon imposition of said wheel means pressure;
   mounting means for mounting said wheel means to turn and to run along the belt and cleat in the longitudinal direction with attached cleat extending longitudinally;
   means for advancing the conveyor belt continuously in the longitudinal direction beneath the wheel means and the blower means to move the cleats in the longitudinal direction while the carriage is stationary;
   said mounting means allowing the wheel means to turn and run in a transverse direction with the cleat extending transversely across the belt with the conveyor belt being stationary while the carriage travels transversely across the conveyor belt, thereby allowing attachment of cleats either longitudinally along the length of said belt or transversely between said lateral sides;
   said means for advancing the conveyor belt advances the conveyor belt intermittently between successively applied, transversely extending cleats.

2. An apparatus in accordance with claim 1 in which said wheel means is removably attached to said carriage, so as to allow for interchangeability of wheel means having different dimensions.

3. An apparatus in accordance with claim 1 in which said wheel means comprises two separate wheels spaced from one another.

4. An apparatus in accordance with claim 1 in which a pressure means applies pressure to the wheel means to aid in fusing the cleat to the belt.

5. An apparatus in accordance with claim 1 in which said wheel means is gear-driven, wherein said gear drive comprises a generally vertical motor which drives a pinion gear, which in turn drives a bull gear integral with said wheel means.

6. An apparatus in accordance with claim 1 in which said wheel means drives said carriage between said conveyor belt lateral sides.

7. An apparatus in accordance with claim 1 in which said mounting means comprises a hinge.

8. An apparatus in accordance with claim 5 in which said pivoting means comprises two flanges hinged together, with said motor, gears, and wheel means attached to a first flange and said second flange attached to said carriage.

9. An apparatus in accordance with claim 8 in which a bracket having either end thereof connected to one of said flanges is employed to maintain said flanges generally perpendicular to one another, thereby maintaining said wheel means in said longitudinal position.

10. An apparatus in accordance with claim 1 in which said carriage support means comprises a plurality of generally parallel shafts with axes generally perpendicular to said belt lateral sides.

11. An apparatus in accordance with claim 10 in which said carriage is supported on said shafts by linear bearings thereby allowing for low friction translation of said carriage between said belt lateral sides.

12. An apparatus in accordance with claim 1 in which said carriage includes adjusting means for moving said blower means both longitudinally and vertically.

13. An apparatus in accordance with claim 1 in which said conveyor belt and cleat rest upon a flat working surface while beneath said wheel means.

14. An apparatus in accordance with claim 13 in which said flat working surface comprises two separate flat surfaces adjacent one another, wherein said surfaces are separable from one another so as to provide a gap beneath said wheel means to accommodate a longitudinal cleat attached to said conveyor belt.

15. An apparatus in accordance with claim 1 in which said carriage includes guide means adjacent said wheel means for positioning said cleat prior to entry beneath said wheel means.

* * * * *

UNITED STATES PATENT AND TRADEMARK OFFICE
CERTIFICATE OF CORRECTION

PATENT NO. : 5,399,226
DATED : March 21, 1995
INVENTOR(S) : Chapman

It is certified that error appears in the above-indentified patent and that said Letters Patent is hereby corrected as shown below:

<u>IN THE CLAIMS</u>:

Column 18, line 3, after "extending" insert --in--.

Column 18, line 3, change "longitudinally" to --longitudinal--.

Column 18, line 16, after "belt" insert --to--.

Column 18, line 34, after "sides;" insert --and--.

Column 18, line 35, change "advances" to --advancing--.

Signed and Sealed this

Twenty-seventh Day of June, 1995

Attest:

BRUCE LEHMAN

*Attesting Officer*  *Commissioner of Patents and Trademarks*